(12) United States Patent
Maier

(10) Patent No.: US 10,776,328 B2
(45) Date of Patent: Sep. 15, 2020

(54) DEVICE AND OPERATING PROCEDURE FOR THE CONTROLLED PROVISION OF INSTALLATION-SPECIFIC DATA FOR ONE OR MORE DATA USERS

(71) Applicant: SIEMENS AKTIENGESELLSCHAFT, Munich (DE)

(72) Inventor: Rupert Maier, Eggolsheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 278 days.

(21) Appl. No.: 15/177,923

(22) Filed: Jun. 9, 2016

(65) Prior Publication Data

US 2017/0024422 A1 Jan. 26, 2017

(30) Foreign Application Priority Data

Jul. 21, 2015 (DE) .......................... 10 2015 213 697

(51) Int. Cl.
*G06F 16/21* (2019.01)
*G06F 21/62* (2013.01)
*G06Q 10/06* (2012.01)

(52) U.S. Cl.
CPC ........ *G06F 16/212* (2019.01); *G06F 21/6254* (2013.01); *G06Q 10/06* (2013.01); *G06Q 10/063* (2013.01); *G06Q 10/067* (2013.01)

(58) Field of Classification Search
CPC ............... G06F 17/30294; G06F 21/31; G06F 21/6254; G06F 16/212; G06Q 10/00; G06Q 10/06; G06Q 10/063; G06Q 10/067

See application file for complete search history.

(56) References Cited

U.S. PATENT DOCUMENTS

| | | | | |
|---|---|---|---|---|
| 7,533,128 B1* | 5/2009 | Sanchez | ................. | G06F 16/20 |
| 9,104,967 B2* | 8/2015 | Dettinger | ............... | G06N 5/025 |
| 9,501,523 B2* | 11/2016 | Hyatt | .................. | G06F 21/6227 |
| 9,934,258 B2* | 4/2018 | Fuglsang | ............ | G06F 16/2452 |
| 10,331,701 B2* | 6/2019 | Cai | ......................... | G06F 16/284 |
| 10,360,232 B2* | 7/2019 | Kirchoff | ............... | G06F 16/258 |
| 2007/0118394 A1* | 5/2007 | Cahoon | .................. | G06Q 50/01 |
| | | | | 705/1.1 |
| 2012/0197852 A1* | 8/2012 | Dutta | ...................... | H04L 67/12 |
| | | | | 707/692 |

(Continued)

*Primary Examiner* — Huawen A Peng
(74) *Attorney, Agent, or Firm* — Schmeiser, Olsen & Watts LLP

(57) ABSTRACT

A device and an operating procedure for the controlled provision of installation-specific data for one or more data users, is provided. The device has a receiving device for receiving project-specific data of a technical installation, a processing device for the identification of particular objects and for mapping the project-specific data to at least one data model, a rule-based device for specifying the type and the extent of the utilization of the data deposited in at least a part of the data model, with the aid of rules, and an interface device for the integration into a device, processing installation-specific data which is designed by means of the specified type and extent of the provision in such a manner as to provide the data deposited in the data model in a data format and/or in a description language usable for the one or the several data users.

22 Claims, 1 Drawing Sheet

(56) References Cited

U.S. PATENT DOCUMENTS

2012/0284280 A1\* 11/2012 Kumar ............... G06F 16/2246
  707/743
2014/0344269 A1   11/2014 Dong et al.
2017/0235848 A1\*  8/2017 Van Dusen ........... G06F 16/904
  705/12

\* cited by examiner

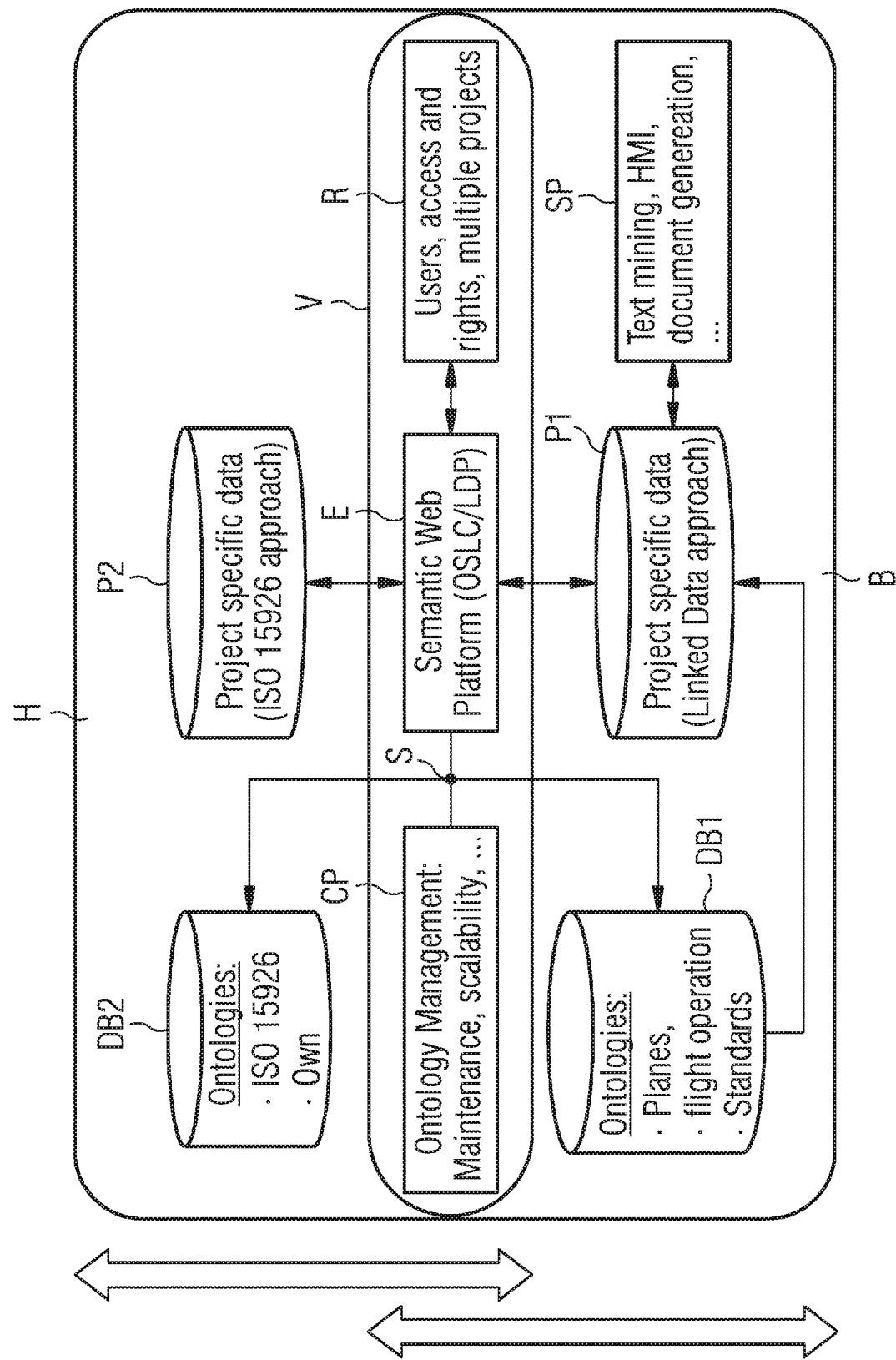

US 10,776,328 B2

DEVICE AND OPERATING PROCEDURE FOR THE CONTROLLED PROVISION OF INSTALLATION-SPECIFIC DATA FOR ONE OR MORE DATA USERS

CROSS-REFERENCE TO RELATED APPLICATION

This application claims priority to European Application No. 102015213697.3 having a filing date of Jul. 21, 2015 the entire contents of which are hereby incorporated by reference.

FIELD OF TECHNOLOGY

The following relates to a device and an operating procedure for the controlled provision of installation-specific data for one or more data users. The following relates to the field of installation engineering, e.g. in industrial production. However, other applications are also conceivable.

BACKGROUND

The processing of large volumes of data, also called big-data applications, has the aim of deriving new information or knowledge from mass data and to generate new business by this means. This processing of large volumes of data profits from a multiplicity of automatisms which are implemented in big-data systems. However, for this purpose, they must be restricted to the interfaces which are offered by the big-data systems. But the possibilities of these applications depend on the availability and accessibility of the basic data. The options of exploitation, optimization and marketing based on in-house data are often already largely exhausted. Either the data pool needed for big-data applications does not contain all data required so that the big-data applications cannot be implemented or only suboptimally, or the access to the required data is too complex, expensive, circumstantial and associated with individual negotiations between the companies involved or can often not be completed due to mistrust.

SUMMARY

An aspect relates to a controlled provision of data and thus to create the data exchange/access for one or more data users.

Embodiments of the invention relate to a device for the controlled provision of installation-specific data for one or more data users, having:
 a receiving device for receiving project-specific data of a technical installation,
 a processing device for the identification of particular objects and possibly an associated functional specification for the technical installation from the project-specific data and for mapping the project-specific data to at least one data model usable for the one or the several data users,
 a rule-based device for specifying the type and the extent of the utilization, requested by the one or the several data users, of the data deposited in at least a part of the data model, with the aid of rules, and
 an interface device for the integration into a device, processing installation-specific data, of the one or the several data users, which is designed by means of the specified type and extent of the provision in such a manner as to provide the data deposited in the data model in a data format and/or in a description language usable for the one or the several data users.

As a rule, a data model is understood to be a model of the data to be described and processed of a field of application (e.g. data of the production area, of the accounting system or the totality of the enterprise data) and their relationships with respect to one another. In informatics, data models occur particularly in conjunction with databases. Data models and the activities performed to generate them (data modeling) can be used for finding and defining the structure for the data to be processed in the systems (particularly for the data to be stored). In this context, the data model can comprise an ontology.

In informatics, ontology is frequently understood to be (formally) ordered representations of a set of conceptions and their interrelationships in a particular subject area. The conceptions can be represented by objects in this context. The subject area can in this case be a project or an industrial installation, respectively.

The rules can be definable by a data user providing the installation-specific data, for the data users requesting the data. Further rules can also be definable by a data user requesting data.

The rules of the providing data user and of the requesting data user can be correlated with one another in order to provide the data controlled on the basis of the correlation.

The project-specific data can comprise at least one object specification and/or one functional specification belonging to one or more objects. The project-specific data can comprise, for example, descriptions relating to the subsystems or assemblies of an installation to be designed of a type of installation.

The said data format and/or the description language and/or the rules can be implemented on the basis of the methods of the so-called Semantic Web.

The functional specification can comprise installation-related or procedural functions and/or operations.

The object specification can comprise a description for a subsystem or an assembly of an installation of a type of installation. The characteristics belonging to an object can comprise at least one characteristic and/or one function of the object.

In this context, the data user can be a user of installations, but also with other applications, e.g. the pure evaluation/analysis of big data, in order to then supply information/data to an installation operator, if necessary.

One embodiment of the invention provides that furthermore a quality monitoring device is designed to check the quality and/or actuality of the data provided on the basis of an existing data model.

One embodiment of the invention provides that a corresponding authentication device is designed to perform an authentication of the one or the several data users.

One embodiment of the invention provides that an accounting device is designed to perform charging of the utilization of the data provided.

From the usable data stored in the data model, further data can be extractable which can be used for evaluations.

The further data can be extractable by means of a classification which can be pre-determined and/or derived from the rules.

The extraction of the further data can be confirmed by the data user and/or can be specified by means of selection of the previously provided usable data.

Embodiments of the invention provide that the interface device is additionally designed to provide the data deposited in the data model at least partially transparently and/or filtered and/or usable in an anonymized and/or pseudonymized manner.

As a result, the data user only receives transparent or filtered data which have been derived from the installation-specific original data in a standardized manner. The data user only receives the right to obtain these derived data, to utilize them (e.g. in a big-data application) and possibly to disperse them further. Anonymization or pseudonymization makes sense if the data user should not find out who has provided the data.

A further aspect of the invention is the operating procedure for the abovementioned device, having the following steps:
  receiving project-specific data of a technical installation,
  identifying particular objects and possibly an associated functional specifications for the objects of the installation from the project-specific data,
  mapping the project-specific data to at least one data model usable for one or more data users,
  specifying the type and the extent of the utilization, requested by the one or the several data users, of the data deposited in at least a part of the data model, with the aid of rules, and
  providing the data deposited in the data model in a data format and/or in a description language usable for the one or the several data users by means of the specified type and extent of the provision.

The device provides means/units or modules for performing the abovementioned operating procedure which can be implemented in each case as hardware and/or firmware and/or software or as computer program or computer program product.

The operating procedure can be developed correspondingly like the device described above.

A further aspect of the invention provides an installation having at least one such device.

In this context, the installation comprises at least one component and is characterized, among other things, by a type of installation. Examples of this are:
  an automation installation,
  a production installation,
  a cleaning installation,
  a water processing installation,
  a machine,
  a fluid kinetic machine,
  an energy production installation,
  an energy network,
  an electricity distribution network,
  a communication network,
  a hospital information system.

A further aspect of the invention is a computer program product or a computer program with means for performing the above-mentioned procedure when the computer program (product) is executed in an above-mentioned device or installation.

Embodiments of the invention also have the following advantages:

The data exchange between the data users or owners providing the data, e.g. manufacturers of such installations and the users requesting data, e.g. operators of such installations, is simplified, systemated and controlled. In this device, it is adjustable and can be monitored which data are provided to the data users in what form. It is reproducible and can be monitored who has used which data. There is no global forwarding of all data. The data remain on the devices of the data owner.

The needed data for the big-data application operator are accessible. Security gaps (e.g. with respect to data misuse) can be closed by him. The data access for the data user is similar to that with a service request at a communication network operator, possibly for a fee. An individual, possibly long-winded negotiation about the type and extent of the data provision or of the data exchange between installation operator and manufacturer is no longer necessary. In addition, standardized formats and functionalities are used for deposition or extraction of the data which are provided. The specification of rules for being able to extract the data by means of a classification and selectively to configure which installation-specific data can be forwarded under which circumstances (with what access rights), are transparent.

Further advantages, details and developments of embodiments of the invention are found in the subsequent description of exemplary embodiments in connection with the drawings, in which the FIGURE diagrammatically shows an architecture for the device according to embodiments of the invention.

BRIEF DESCRIPTION

Some of the embodiments will be described in detail, with reference to the following FIGURES, wherein like designations denote like members, wherein:

FIG. 1 schematically depicts an embodiment for providing data from a manufacturer H to an operator B.

DETAILED DESCRIPTION

The device V shown in the FIGURE provides data from a manufacturer H to an operator B. The scenario shown in the following is also possible in the reverse direction so that the operator can provide data with respect to his installation to the manufacturer.

In FIG. 1, the following components or facilities are shown:
  a receiving device E which receives project-specific data from databases P1 and P2,
  a processing device CP for the identification of particular objects and possibly an associated functional specification and for mapping the project-specific data into at least one data model usable for the one or the several operators or into at least one ontology usable by these,
  a rule-based device R for specifying the access by a particular one or by a number of particular operators to at least a part of the data model,
  an interface device S to provide the data model in a data format and/or in a description language for the one or the several operators B usable for their database DB2. Conversely, the data model can be provided by an operator B for a manufacturer usable for his database DB2.
  The project-specific data from P1 or P2, respectively, can comprise at least one object specification and/or one functional specification belonging to one or more objects. The project-specific data can comprise, for example, a description for components or assemblies of an installation to be designed, of a type of installation, wherein these project-specific data can come from installation documentations deposited in a memory SP.

The device is designed in such a manner that it has the following functionalities:

A registration of operator and manufacturer is possible, the access rights to installation-specific data (contents)/ontologies for the registered subscribers (e.g. operator, manufacturer) are deposited in the rule-based device. The authentication process of the respective subscribers is also controlled via this device.

In this rule-based device, other rules and definitions are also deposited: e.g.
- definition of a company-internal data deposition node, e.g. the database DB1 or DB2.
- Definition of the features of the data which are deposited on the internal data node
- Definition of the utilization conditions (rules) for the deposited data (models) or ontologies.
- Depositing own data (models) in a standardized data format to the internal data node. In this context, the data features must be described semantically in accordance with prefabricated criteria and can be combined in an ontology.

A plausibility and quality control can be performed for the data deposited locally in a data node.

Data management or data provision is possible, i.e. the device according to embodiments of the invention, e.g. a central server, generates an overview of all available data nodes present at various participants and their contents. With the aid of an authentication device, not shown, the access or type and extent of the utilization of the information deposited on an internal data node can be controlled or monitored or regulated by other participants (e.g. operator B). Due to suitable security measures, this is only possible by adhering to the rules predetermined by the data owner, deposited in the rule-based device R, and under the conditions specified there. In accordance with these settings, no direct data access is guaranteed. Nevertheless, it can be allowed in such a case, if permitted by the data owner (e.g. here in the example the manufacturer H) that the data can be utilized for specific evaluations (e.g. statistical considerations).

From the usable data deposited in the data model, further data can be extractable which can be used for evaluations. The further data can be extractable by means of a classification which can be predetermined and/or derived from the rules. The extraction of the further data can be confirmed by the data user or specified by means of selection of the previously provided usable data.

In order to ensure that absolutely no unwanted utilization of the data by other participants can take place, the algorithms are predefined for such evaluations and their mode of operation is accessible to everyone, i.e. the source code or the description language, respectively, are transparent to the participants. In addition, these algorithms/rules are expressively executed on the internal data node. No recopying of the original data to the outside is therefore possible. Each of the predefined data utilization rules is in principle capable of generating a utilization history or a fingerprint. This describes who has accessed the respective data in what manner. The utilization of this functionality is adjustable by the data owner. Test capabilities are also provided in order to find out what maximum extent of data is provided for possible other users or participants.

It is possible that a further central component, not shown, generates statistical information on utilization frequency and a measure on usefulness and quality of the data. Thus, redundant, unusable, wrong or outdated data can be removed automatically.

A further accounting device, not shown, determines, before data utilization, the cost to be expected and supports the automated charging for the data utilization of the participants.

In addition, the device according to embodiments of the invention has functionalities on the manual care for the data and on the configuration of an internal local data node which, for example, is identified by CP in the FIGURE.

Although the invention has been illustrated and described in detail by the preferred exemplary embodiment, the invention is not restricted by the examples disclosed and other variations can be derived therefrom by the expert without departing from the scope of the invention.

The invention claimed is:

1. A method for controlling the provision of project-specific data of a technical installation, the method comprising the following steps:
   receiving project-specific data of the technical installation from one or more data owners, wherein the project-specific data is accompanied by at least one predetermined utilization condition, wherein the at least one predetermined utilization condition is a rule that must be followed in order for access to the project-specific data to be provided;
   identifying particular objects and an associated functional specification for the objects of the installation from the project-specific data;
   mapping the project-specific data to at least one data model usable for one or more data users;
   specifying the type and the extent of the utilization, requested by the one or the several data users, of the data deposited in at least a part of the data model, with the aid of rules, wherein the rules comprise the at least one predetermined utilization condition; and
   providing the data deposited in the data model in a data format and/or in a description language usable for the one or the several data users by means of the specified type and extent of the utilization such that the provided data is used in accordance with the at least one predetermined utilization condition.

2. The method as claimed in claim 1, wherein further rules are defined by a data user requesting data.

3. The method as claimed in claim 1, wherein the rules of the providing data owner and the requesting data user are correlated with one another in order to provide the data controlled on the basis of the correlation.

4. The method as claimed in claim 1, wherein the data model has an ontology.

5. The method as claimed in claim 1, wherein the project-specific data belong to at least one object-specification and/or one functional specification belonging to one or several objects.

6. The method as claimed in claim 1, wherein the said data format and/or the description language and/or the rules are implemented on basis of Semantic Web methods.

7. The method as claimed in claim 1, wherein the quality and/or actuality of the data provided is checked.

8. The method as claimed in claim 1, wherein an authentication of the one or the several data users is performed.

9. The method as claimed in claim 1, wherein charging of the utilization of the data provided is performed.

10. The method as claimed in claim 1, wherein from the usable data deposited in the data model, further data can be extracted which are used for evaluations.

11. The method as claimed in claim 10, wherein the further data are extractable by means of a classification which can be predetermined and/or derived from the rules.

12. The method as claimed in claim 10, wherein extraction of the further data is confirmed by the data user and/or can be specified by means of selection of the usable data previously provided.

13. The method as claimed in claim 1, wherein the data deposited in the data model are at least partially transparent and/or filtered and/or provided usable in anonymized and/or pseudonymized manner.

14. A computer program product with means for performing the method as claimed in claim 1 when the computer program product is executed.

15. A method for providing data, the method comprising:
receiving first data from a first data owner, wherein the first data is accompanied by at least one first data rule, the at least one first data rule set by the first data owner and governing access and use of the first data by data users;
receiving second data from a second data owner, wherein the second data is accompanied by at least one second data rule, the at least one second data rule set by the second data owner and governing access and use of the second data by data users;
identifying particular objects and an associated functional specification for the objects from the first data and the second data;
mapping the first data and the second data to at least one data model usable by the data users;
receiving, at least one data user of the data users, a request for data from the data model;
specifying a type and an extent of permitted utilization of the requested data from the data model, wherein the first data rule is applied to first data in the data from the data model and the second data rule is applied to second data in the data from the data model; and
providing the data from the data model in a data format and/or in a description language usable for the at least one data user by means of the specified type and extent of the provision such that the provided data is used in accordance with the respective first data rule and second data rule.

16. The method of claim 15, wherein the request for data from the data model includes at least one data request rule.

17. The method of claim 16, further comprising:
identifying data to be provided based at least in part on the request for data and a correlation between the at least one data request rule and at least one of the first data rule and the second data rule.

18. The method of claim 17, wherein the step of providing the data from the data model in a data format and/or in a description language usable for the at least one data user by means of the specified type and extent of the provision such that the provided data is used in accordance with the respective first data rule and second data rule includes providing the identified data.

19. The method of claim 17, wherein the step of specifying the type and the extent of permitted utilization of the requested data from the data model is also based on application of the at least one data request rule.

20. The method of claim 19, wherein the step of providing the data from the data model in a data format and/or in a description language usable for the at least one data user by means of the specified type and extent of the provision such that the provided data is used in accordance with both the at least one data request rule and the respective first data rule and second data rule.

21. The method of claim 15, wherein the step of providing data comprises providing filtered data that has been derived from the at least one data model.

22. The method of claim 21, wherein no direct data access is provided to the first data or the second data.

* * * * *